UNITED STATES PATENT OFFICE.

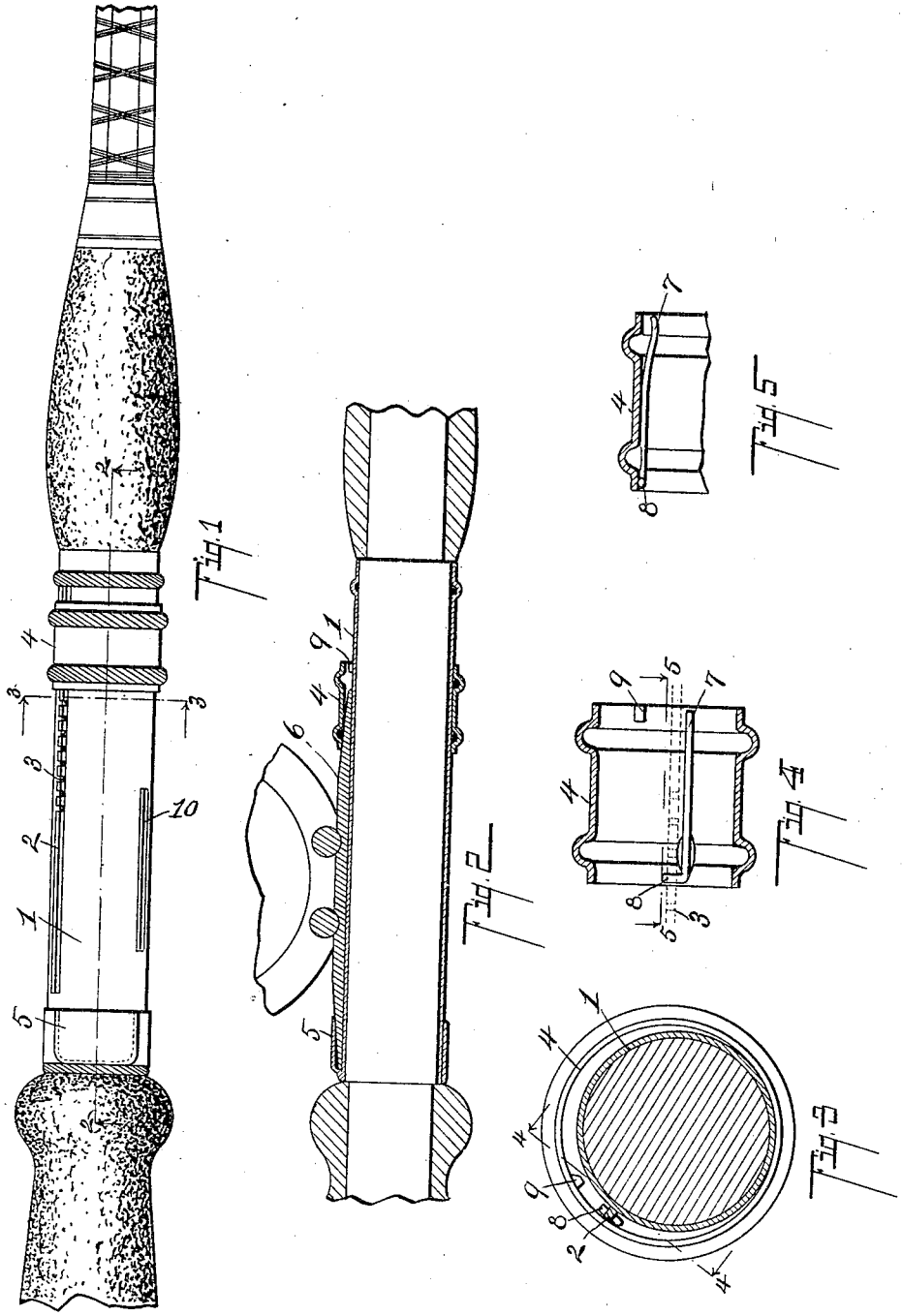

WILLIAM T. HEDDON, OF CHETEK, WISCONSIN.

REEL-CLAMP FOR FISHING-RODS.

No. 837,565.  Specification of Letters Patent.  Patented Dec. 4, 1906.

Application filed September 22, 1906. Serial No. 335,771.

*To all whom it may concern:*

Be it known that I, WILLIAM T. HEDDON, a citizen of the United States, residing at Chetek, Wisconsin, have invented certain new and useful Improvements in Reel-Clamps for Fishing-Rods, of which the following is a specification.

This invention relates to improvements in reel-clamps for fishing-rods.

The main object of this invention is to provide an improved reel-clamp for fishing-rods by which a reel may be securely locked in position and one which is at the same time very quickly and easily adjusted to secure or release the reel.

Further objects and objects relating to structural details will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawings, forming a part of this specification, in which—

Figure 1 is a detail plan of a structure embodying the features of my invention. Fig. 2 is a detail longitudinal section taken on a line corresponding to line 2 2 of Fig. 1. Fig. 3 is an enlarged cross-section taken on a line corresponding to line 3 3 of Fig. 1. Fig. 4 is an enlarged longitudinal section through the adjustable clamping-collar 4, taken on the line 4 4 of Fig. 3. Fig. 5 is an enlarged detail section taken on a line corresponding to line 5 5 of Fig. 4.

In the drawings the sectional views are taken looking in the direction of the little arrows at the end of the section-lines, and similar reference characters refer to similar parts throughout the several views.

Referring to the drawings, a sleeve or tubular support 1 is mounted upon the handle or base section of the reel-seat in the usual or any desired position. The support 1 is provided with longitudinal ribs 2 and 10, which form a seat for the reel base-plate, as 6. The rib 2 is provided with a plurality of notches 3, the object of which will appear later. At one end of the reel-seat is a fixed clamping member 5, adapted to receive one end of the reel base-plate, as is illustrated in Fig. 2. An adjustable clamping-collar 4 is provided for securing the other end of the reel base-plate.

Within the collar 4 is secured a spring 7, preferably arranged longitudinally of the collar. This spring forms a frictional engagement with the collar to the support, so that it does not slip around freely thereon. The end of the spring 8 is preferably turned transversely to form a catch for engaging the notches 3 and the rib 2, so that the clamping-collar may be drawn up snugly on the reel base-plate and turned to bring the catch into engagement with the notches, thereby locking the collar in place On the opposite side of the rib 2 is an inwardly-projecting stop 9, which coacts with the spring 7 to limit the rotation of the collar, so that as the spring 7 prevents accidental longitudinal movement it is always in position to be quickly locked or engaged with the rib.

By this arrangement of parts I secure in a simple and effective manner a reel-clamp which although very secure is very simple in structure and in adjustment and, as is evident, it is very economical to produce.

I claim—

1. A reel-clamp comprising a support, having longitudinal ribs thereon, forming a seat for the reel base-plate, one of the said ribs having a plurality of notches therein; a fixed clamping member for one end of the reel base-plate; a clamping-collar for the other end of the reel base-plate adjustably mounted on said support; a spring longitudinally arranged within said collar, having one end turned transversely to engage the notches in the said rib; and an inwardly-projecting stop on said collar, coacting with said notched rib to limit the movement of said collar on said support.

2. A reel-clamp comprising a support, having longitudinal ribs thereon, forming a seat for the reel base-plate, one of the said ribs having a plurality of notches therein; a fixed clamping member for one end of the reel base-plate; a clamping-collar for the other end of the reel base-plate adjustably mounted on said support; and a spring longitudinally arranged within said collar, having one end turned transversely to engage the notches in the said rib.

3. A reel-clamp comprising a support, having a longitudinal rib thereon, said rib having a plurality of notches therein; a fixed clamping member for one end of the reel base-plate; a clamping-collar for the other end of the reel base-plate adjustably mounted on said support; a spring arranged within said collar; a catch on said collar adapted to engage said notched rib for locking said collar in its adjusted positions; and an inwardly-projecting stop on said collar, coacting to limit its movement on said support.

4. A reel-clamp comprising a support, having a longitudinal rib thereon, said rib having a plurality of notches therein; a fixed clamping member for one end of the reel base-plate; a clamping-collar for the other end of the reel base-plate adjustably mounted on said support; a spring arranged within said collar; and a catch on said collar adapted to engage said notched rib for locking said collar in its adjusted positions.

In witness whereof I have hereunto set my hand and seal in the presence of two witnesses.

WILLIAM T. HEDDON. [L. S.]

Witnesses:
  GEO. M. PAULUS,
  I. R. GAVIN.